US010819557B1

(12) United States Patent
Epshtein et al.

(10) Patent No.: US 10,819,557 B1
(45) Date of Patent: Oct. 27, 2020

(54) SYSTEMS AND METHODS FOR SELECTIVE DISCOVERY OF SERVICES

(71) Applicant: ServiceNow, Inc., Santa Clara, CA (US)

(72) Inventors: Tal Epshtein, Hod Hasharon (IL); Alon Mansour, Ramat Gan (IL); Leonid Suslov, Tel Aviv (IL); Oded Tsur, Macabim (IL); Arik Sityon, Ganney Tikva (IL)

(73) Assignee: ServiceNow, Inc., Santa Clara, CA (US)

(*) Notice: Subject to any disclaimer, the term of this patent is extended or adjusted under 35 U.S.C. 154(b) by 0 days.

(21) Appl. No.: 16/577,892

(22) Filed: Sep. 20, 2019

Related U.S. Application Data

(60) Provisional application No. 62/843,129, filed on May 3, 2019.

(51) Int. Cl.
*H04L 12/00* (2006.01)
*H04L 12/24* (2006.01)

(52) U.S. Cl.
CPC .......... *H04L 41/024* (2013.01); *H04L 41/082* (2013.01); *H04L 41/0853* (2013.01); *H04L 41/18* (2013.01)

(58) Field of Classification Search
CPC ... H04L 67/306; H04L 67/303; H04L 67/325; H04L 67/24; G06F 9/505; G06F 9/5027; H04W 8/005; H04W 48/16; H04N 21/47202
USPC ................................. 709/220, 223, 202, 217
See application file for complete search history.

(56) References Cited

U.S. PATENT DOCUMENTS

| | | | |
|---|---|---|---|
| 5,978,594 A | 11/1999 | Bonnell et al. | |
| 6,816,898 B1 | 11/2004 | Scarpelli et al. | |
| 6,909,721 B2* | 6/2005 | Ekberg | H04W 48/16 370/313 |
| 7,027,411 B1 | 4/2006 | Pulsipher et al. | |
| 7,392,300 B2 | 6/2008 | Anantharangachar et al. | |
| 7,617,073 B2 | 11/2009 | Trinon et al. | |
| 7,877,783 B1 | 1/2011 | Cline et al. | |
| 7,945,860 B2 | 5/2011 | Vambenepe et al. | |
| 8,326,913 B2* | 12/2012 | Chen | G06F 9/5027 709/202 |
| 8,533,507 B2* | 9/2013 | Vandwalle | H04L 67/325 713/320 |
| 9,544,754 B1* | 1/2017 | Lambert | H04W 8/005 |
| 10,545,796 B2* | 1/2020 | Bahramshahry | G06F 9/505 |

(Continued)

OTHER PUBLICATIONS

U.S. Appl. No. 15/882,711, filed Jan. 29, 2018, Tilikin et al.

(Continued)

*Primary Examiner* — Frantz Coby
(74) *Attorney, Agent, or Firm* — Fletcher Yoder PC

(57) ABSTRACT

A system and a process are disclosed for selective discovery of services. Present embodiments include a graphical user interface (GUI) that enables a designer to create and configure a discovery schedule that includes one or more filters. These filters enable the designer to define particular attributes and attribute values of services or service groups. Each time the discovery schedule is executed, the discovery scheduler again determines which currently defined services satisfy the conditions of the filters, and then instructs a discovery server to discover only the qualifying services associated with a client network.

20 Claims, 10 Drawing Sheets

(56) References Cited

U.S. PATENT DOCUMENTS

| | | | | |
|---|---|---|---|---|
| 2005/0188062 A1* | 8/2005 | Li | ............... | H04L 67/306 |
| | | | | 709/220 |
| 2007/0240189 A1* | 10/2007 | Paila | ............... | H04L 67/24 |
| | | | | 725/62 |
| 2011/0153773 A1* | 6/2011 | Vandwalle | ............ | H04L 67/325 |
| | | | | 709/217 |
| 2011/0247039 A1* | 10/2011 | Cheng | ............. | H04N 21/47202 |
| | | | | 725/52 |
| 2012/0005323 A1* | 1/2012 | Li | ............... | H04L 67/303 |
| | | | | 709/223 |
| 2016/0278112 A1* | 9/2016 | Liu | ............... | H04W 8/005 |

OTHER PUBLICATIONS

U.S. Appl. No. 16/151,865, filed Oct. 4, 2018, Steuer et al.
U.S. Appl. No. 16/249,765, filed Jan. 16, 2019, Ben Ari et al.
U.S. Appl. No. 16/356,267, filed Mar. 18, 2019, Dukhovny et al.
U.S. Appl. No. 16/368,563, filed Mar. 28, 2019, Sant et al.
U.S. Appl. No. 16/401,968, filed May 2, 2019, Suslov et al.
U.S. Appl. No. 16/402,000, filed May 2, 2019, Ben Ari et al.
U.S. Appl. No. 15/587,881, filed May 5, 2017, Biran et al.
U.S. Appl. No. 16/553,983, filed Aug. 28, 2019, Biran et al.
U.S. Appl. No. 16/573,822, filed Sep. 17, 2019, Steuer et al.

* cited by examiner

FIG. 9

SYSTEMS AND METHODS FOR SELECTIVE DISCOVERY OF SERVICES

CROSS-REFERENCE

This application claims priority from and the benefit of U.S. Provisional Application No. 62/843,129, entitled "SYSTEMS AND METHODS FOR SELECTIVE DISCOVERY OF SERVICES AND SERVICE GROUPS," filed May 3, 2019, which is incorporated by reference herein in its entirety for all purposes.

BACKGROUND

The present disclosure relates generally to a configuration management database (CMDB) platform, and more specifically, to discovery of services for a CMDB platform.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g. computing devices, load balancers, firewalls, switches, etc.) and software resources (e.g. productivity software, database applications, custom applications, and so forth). Over time, more and more organizations have turned to cloud computing approaches to supplement or enhance their IT infrastructure solutions.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations, which resources may be used to perform a variety of computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

Certain cloud computing services can host a configuration management database (CMDB) that tracks information regarding configuration items (CIs) associated with a client. For example, these CIs may include hardware, software, and combinations thereof, disposed on, or operating within, a client network. Additionally, the CMDB may define discovery jobs that are provided to a discovery server operating on the client network, and the discovery server may execute the discovery jobs to collect CI data that is provided to, and stored within, the CMDB.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Present embodiments are directed to enabling a selective discovery process for services for use in a CMDB. As discussed below, present embodiments include a graphical user interface (GUI) that enables a designer to create and configure a service-based discovery schedule that includes one or more filters. These filters enable the designer to define particular attributes and attribute values of services or service groups, including the ability to perform partial matching and wildcard filters. When the discovery schedule with one or more filters is being created, then the GUI is capable of presenting a list of currently defined services or service groups that satisfy the conditions of the filters. Additionally, when the discovery schedule is executed, the discovery scheduler again determines which currently defined services or service groups satisfy the conditions of the filters, and then instructs a discovery server to discover only the qualifying services.

BRIEF DESCRIPTION OF THE DRAWINGS

Various aspects of this disclosure may be better understood upon reading the following detailed description and upon reference to the drawings in which:

FIGS. 6, 7, 8, and 9 are simulated screenshots of portions of an embodiment of a graphical user interface (GUI) of the discovery scheduler, in accordance with aspects of the present technique.

DETAILED DESCRIPTION

Figure 1:
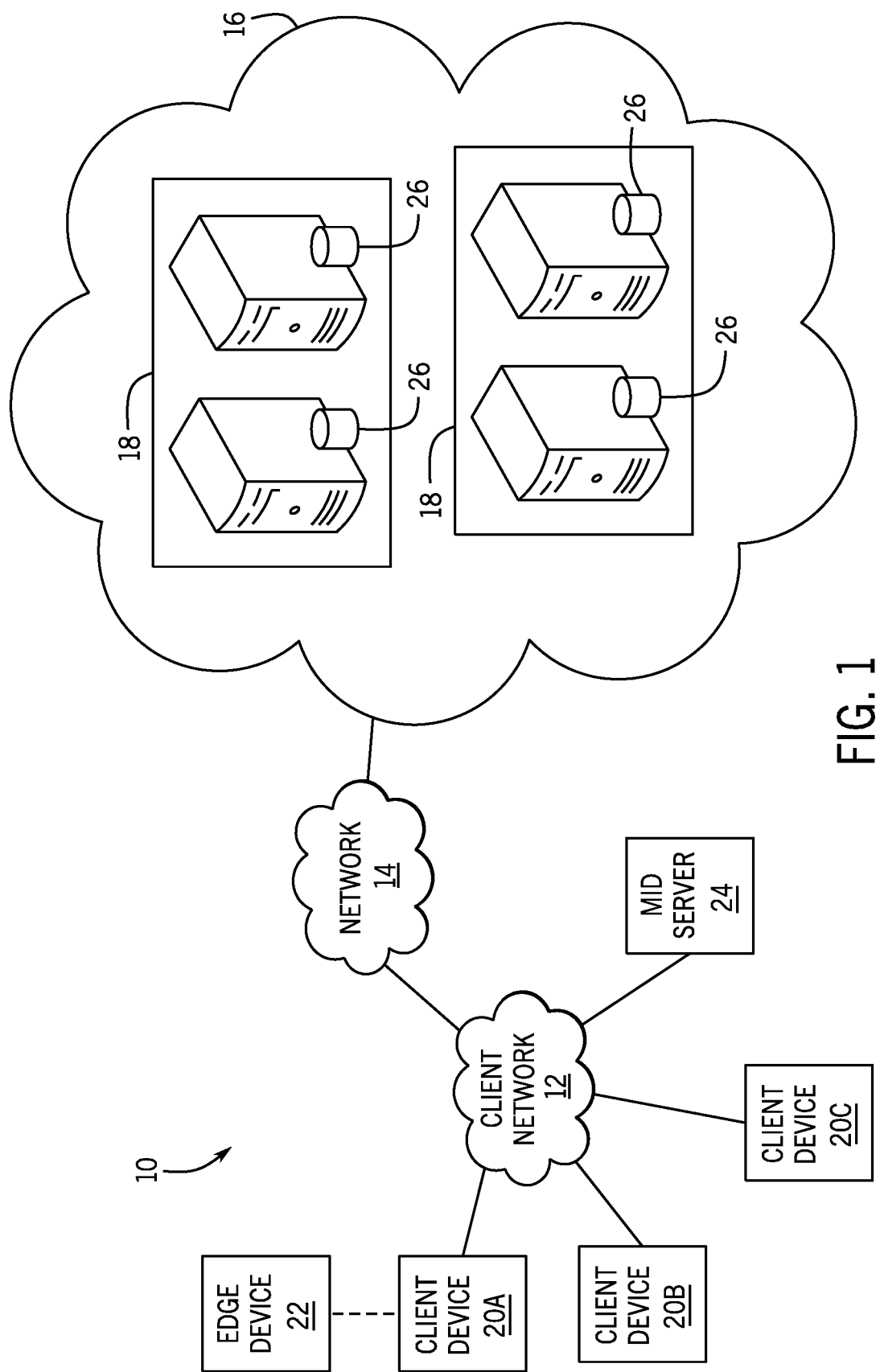
FIG. 1 is a block diagram of an embodiment of a cloud computing system in which embodiments of the present technique may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, scripts, programs, processes, workloads, threads and/or a set of computing instructions executed by a computing system. Example embodiments of an application include software modules, software objects, software instances and/or other types of executable code.

As used herein, the term "configuration item" or "CI" refers to a record for any component (e.g., computer, device, piece of software, database table, script, webpage, piece of metadata, and so forth) in an enterprise network, for which relevant data, such as manufacturer, vendor, location, or similar data, is stored in a CMDB. As used herein, a "service" refers to a group of interrelated CIs that cooperate to perform an overall function, such as a backup service, a data migration service, a virus scanning service, etc. As used herein, a "service group" refers to a group of services that cooperate to perform a collection of functions. It may be appreciated that a service or service group may itself be a CI of the CMDB that includes or is associated with multiple interrelated CIs (e.g., hardware, software) that cooperate to perform a function. As used herein, "discovery" refers to the process of probing and collecting CI data from an enterprise network that is provided to, and stored within, the CMDB.

Present embodiments are directed to enabling a selective service-based discovery process for use in a CMDB. As discussed below, present embodiments include a graphical user interface (GUI) that enables a designer to create and configure a discovery schedule that includes one or more filters. These filters enable the designer to select particular attributes of services or service groups and define attribute values or value ranges for the selected attributes. When the discovery schedule with one or more filters is being created, then the GUI is capable of presenting a list of currently defined services or service groups that satisfy the conditions of the filters. Additionally, when the discovery schedule is executed after creation, the discovery scheduler again determines which currently defined services or service groups satisfy the conditions of the filters, and then instructs a discovery server to discover CI data on the client network for only the qualifying services.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device, agent, or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
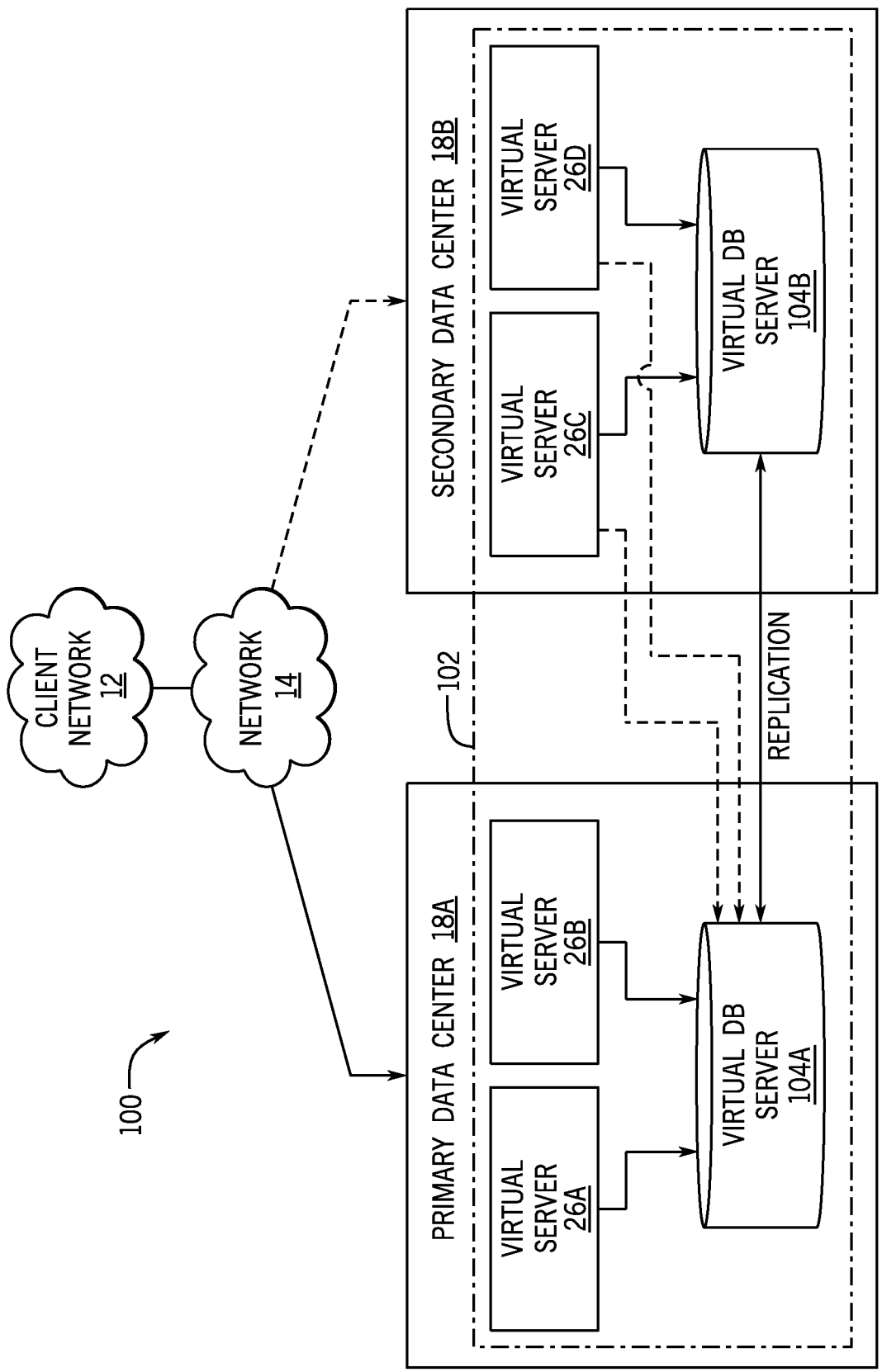
FIG. 2 is a block diagram of an embodiment of a multi-instance cloud architecture in which embodiments of the present technique may operate.

FIG. 2 is a schematic diagram of an embodiment of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another. Using FIG. 2 as an example, network environment and service provider cloud infrastructure client instance 102 (also referred to herein as a client instance 102) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 102. In the depicted example, to facilitate availability of the client instance 102, the virtual servers 26A-26D and virtual database servers 104A and 104B are allocated to two different data centers 18A and 18B so that one of the data centers 18 acts as a backup data center. Other embodiments of the multi-instance cloud architecture 100 could include other types of dedicated virtual servers, such as a web server. For example, the client instance 102 could be associated with (e.g., supported and enabled by) the dedicated virtual servers 26A-26D, dedicated virtual database servers 104A and 104B, and additional dedicated virtual web servers (not shown in FIG. 2).

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
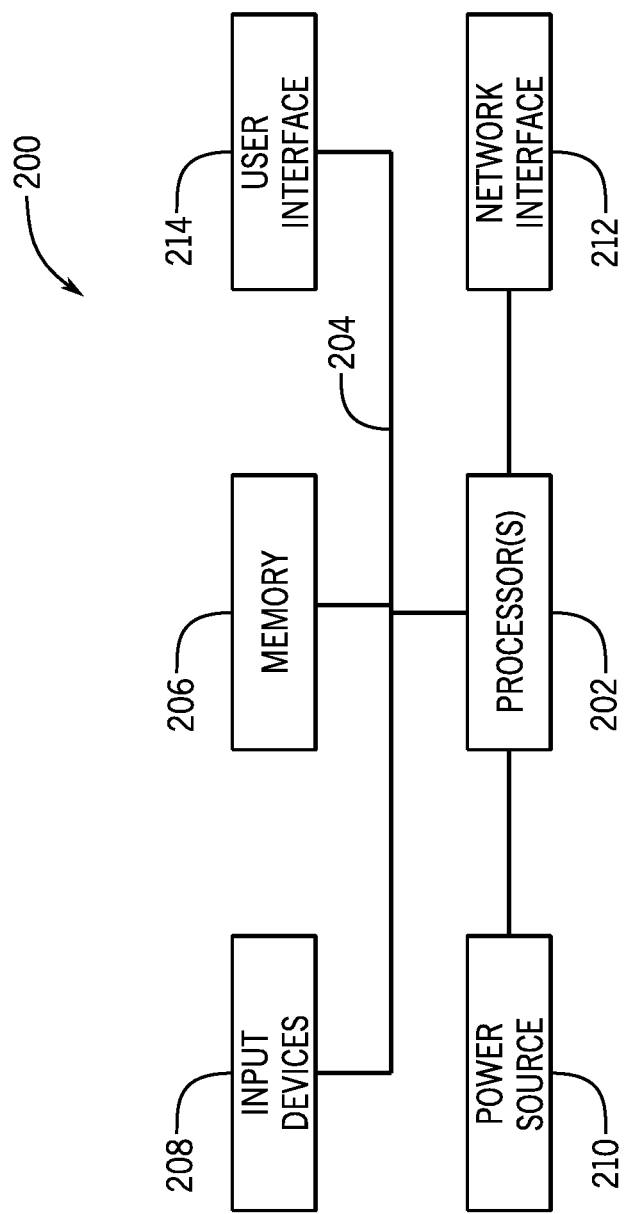
FIG. 3 is a block diagram of a computing device utilized in a computing system that may be present in FIG. 1 or 2, in accordance with aspects of the present technique.

By way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing device 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
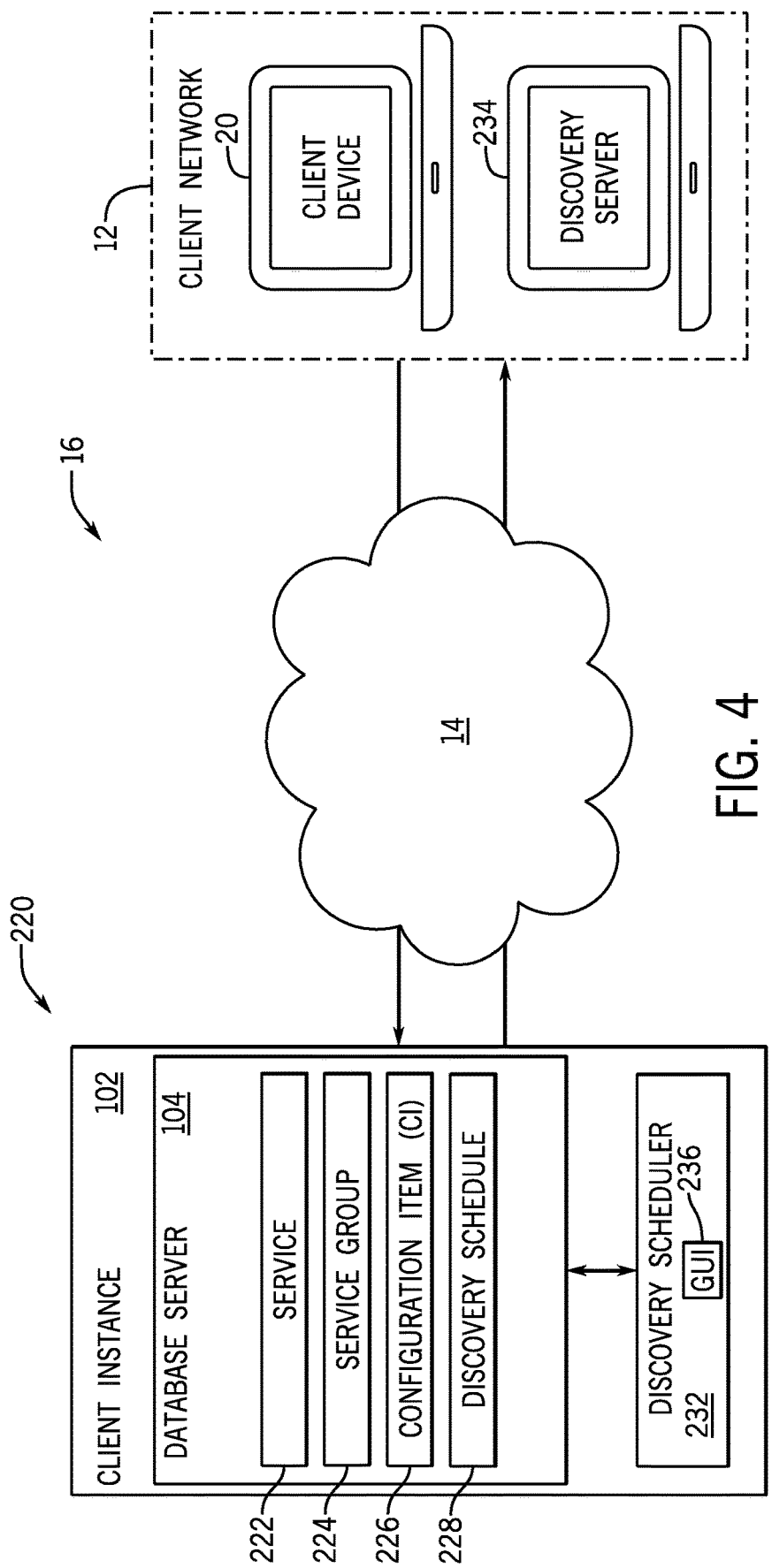
FIG. 4 is a block diagram illustrating an embodiment in which a virtual server supports and enables a client instance as part of a configuration management database (CMDB), in accordance with aspects of the present technique.

With the preceding in mind, FIG. 4 is a block diagram illustrating an embodiment in which a virtual server supports and enables the client instance 102 as part of a configuration management database (CMDB) 220, according to one or more disclosed embodiments. More specifically, FIG. 4 illustrates an example of a portion of a service provider cloud infrastructure, including the cloud-based platform 16 discussed above. The cloud-based platform 16 is connected to a client device 20 via the network 14 to provide a user interface to network applications executing within the client instance 102 (e.g., via a web browser of the client device 20). Client instance 102 is supported by virtual servers 26 similar to those explained with respect to FIG. 2, and is illustrated here to show support for the disclosed functionality described herein within the client instance 102. Cloud provider infrastructures are generally configured to support a plurality of end-user devices, such as client device 20, concurrently, wherein each end-user device is in communication with the single client instance 102. Also, cloud provider infrastructures may be configured to support any number of client instances, such as client instance 102, concurrently, with each of the instances in communication with one or more end-user devices. As mentioned above, an end-user may also interface with client instance 102 using an application that is executed within a web browser.

For the embodiment illustrated in FIG. 4, the client instance 102 includes, and is supported by, the database server 104. The database server 104 hosts a number of database tables storing information relating to the operation of the CMDB 220. For example, the illustrated database server 104 hosts a Service table 222 that stores information related to services operating on or associated with the client network 12, a Service Group table 224 that stores information related to service groups (e.g., groups of the services defined in the Service table 222) operating on or associated with the client network 12, and additional Configuration Item (CI) tables 226 that store information relating to CIs (e.g., hardware and software) operating on, or otherwise associated with, the client network 12. The database server 104 also hosts a Discovery Schedule table 228 store information related to discovery schedules and discovery schedule filters defined by a designer, as discussed below. It may be appreciated that the illustrated tables may be related to one another in different suitable manners to ensure data integrity.

The client instance 102 also hosts a discovery scheduler 232. The discovery scheduler 232 is an application including instructions that enable the client instance 102 to request a discovery server 234 (e.g., the MID server 24 of FIG. 1) to execute a discovery job on the client network 12 to collect CI data that is subsequently stored in the CI tables 226. For example, in certain embodiments, the discovery scheduler 232 may be hosted or executed by a virtual server 26 (e.g., an application server) associated with the client instance, as shown in FIG. 2, which is supported by suitable memory and processor circuitry, as discussed above. For the embodiment illustrated in FIG. 4, the discovery scheduler 232 includes an associated graphical user interface (GUI) 236 that enables a designer to create and modify discovery schedules and corresponding filters stored in the Discovery Schedule table 228. For example, as mentioned, this GUI 236 may be executed within a web browser of the client device 20 to enable the designer to define discovery schedules and their associated filters. The GUI 236 is discussed in greater detail below with respect to FIGS. 6-9.

Figure 5:
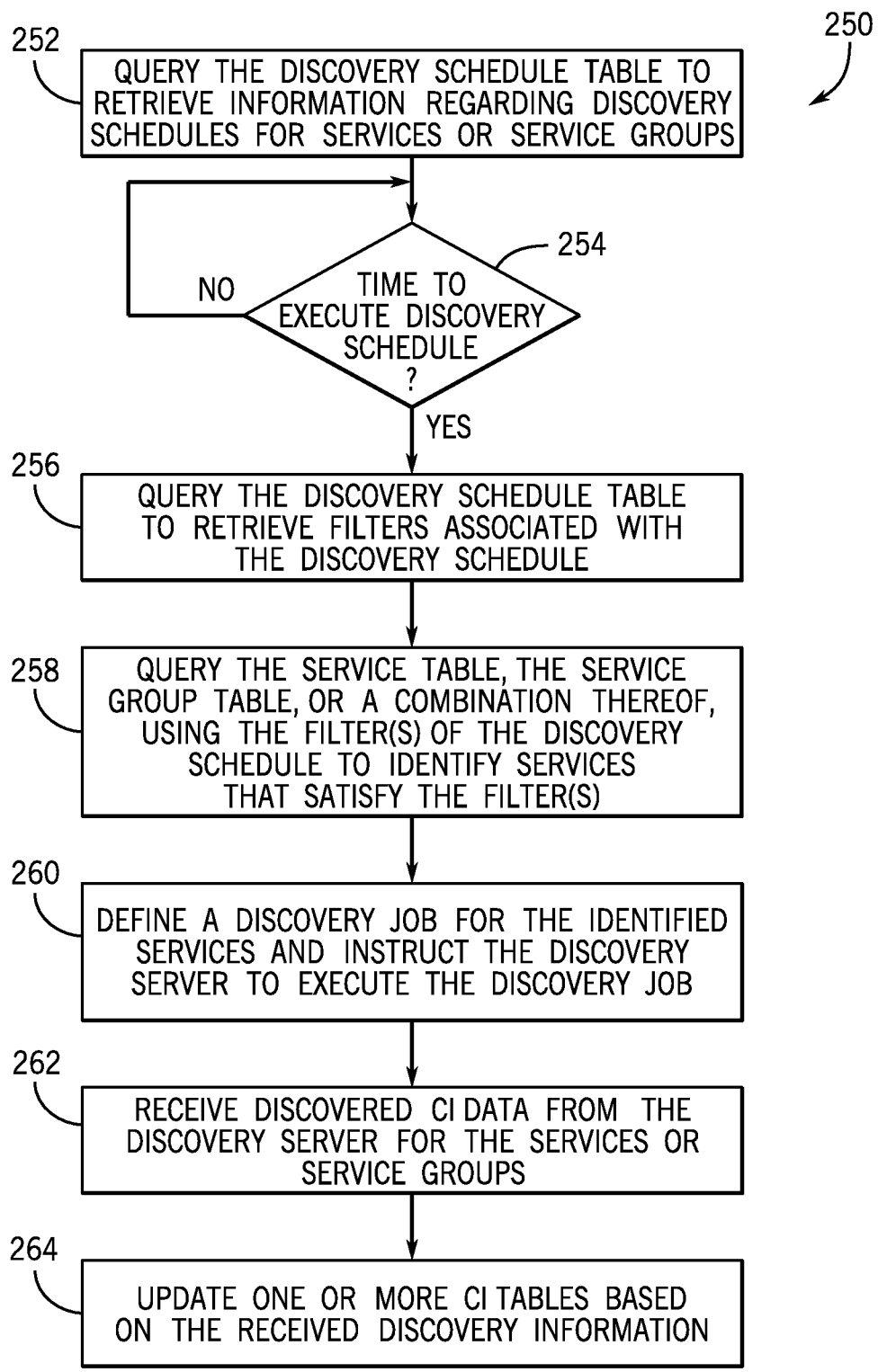
FIG. 5 is a flow diagram illustrating an example embodiment of a process by which the discovery scheduler executes a discovery schedule, in accordance with aspects of the present technique.

FIG. 5 is a flow diagram illustrating an example embodiment of a process 250 by which the discovery scheduler 232 executes a discovery schedule. It may be appreciated that the process 250 is merely an example, and in other embodiments, the process 250 may include additional steps, repeated steps, omitted steps, and so forth, in accordance with the present disclosure. The process 250 is discussed with reference to elements illustrated in FIG. 4. The process 250 may be stored in a suitable memory (e.g., memory 206) and executed by a suitable processor (e.g., processor 202) associated with the client instance 102.

For the embodiment illustrated in FIG. 5, the process 250 begins with the discovery scheduler 232 querying (block 252) the Discovery Schedule table 228 to determine information regarding a discovery schedule for services (e.g., a service-based discovery schedule). This information (also referred to herein as properties of a discovery schedule) may include, for example, a name, a scheduled run time, a maximum run time, an execution time, an execution frequency, and so forth, of the discovery schedule, as discussed below. When the discovery scheduler 232 determines (decision block 254), based on the queried discovery schedule information, that it is an appropriate time for a corresponding discovery job to be executed by the discovery server 234, the discovery scheduler 232 queries (block 256) the Discovery Schedule table 228 to retrieve all filters associated with the particular discovery schedule. In certain embodiments, the filters associated with the discovery schedule may be retrieved along with the discovery schedule information retrieved in block 252 for enhanced efficiency.

For the embodiment illustrated in FIG. 5, the discovery scheduler 232 then queries (block 258) the Service table 222, and potentially the Service Group table 224, to identify all services that satisfy the conditions of the filters retrieved in block 256. For example, for a discovery schedule having a "service" discovery type, in block 258, the discovery scheduler 232 queries the Service table 222 to identify all services that satisfy the conditions of the filters. By way of further example, for a discovery schedule having a "service group" discovery type, in block 258, the discovery scheduler 232 may first query the Service Group table 224 to identify all service groups that satisfy the conditions of the filters, and then query the Service table 222 to identify all services that are associated with (e.g., belong to) the service groups returned by the first query. It may be appreciated that, while this is described as two separate queries for clarity, in certain embodiments, these two queries may be combined into a single query for reduced overhead and improved efficiency.

Continuing through the embodiment illustrated in FIG. 5, the discovery scheduler 232 subsequently defines (block 260) a discovery job that includes all services that are returned by the one or more queries of block 258, and instructs the discovery server 234 to execute the discovery job on the client network 12. The discovery server 234 executes the discovery job to collect CI data for the services defined in the discovery job and returns the CI data to the client instance 102. The discovery scheduler 232 receives (block 262) the discovered CI data from the discovery server 234 for the services defined in the discovery job. Additionally, the discovery scheduler 232 updates (block 264) the appropriate CI tables (e.g., the Service table 222, the Service Group table 224, other CI tables 226) of the CMDB 220 based on the received CI data.

Figure 6:
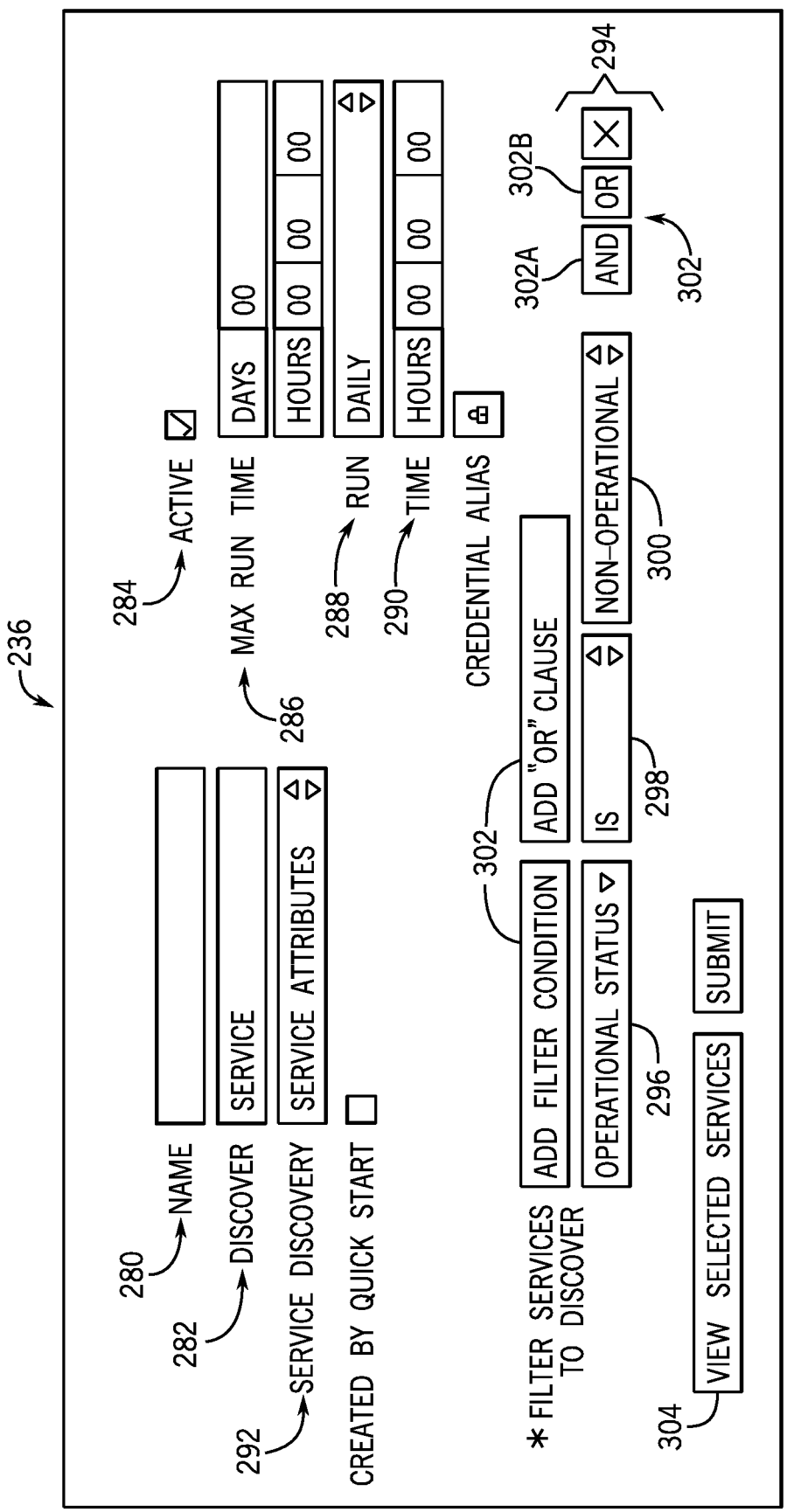
Figure 7:
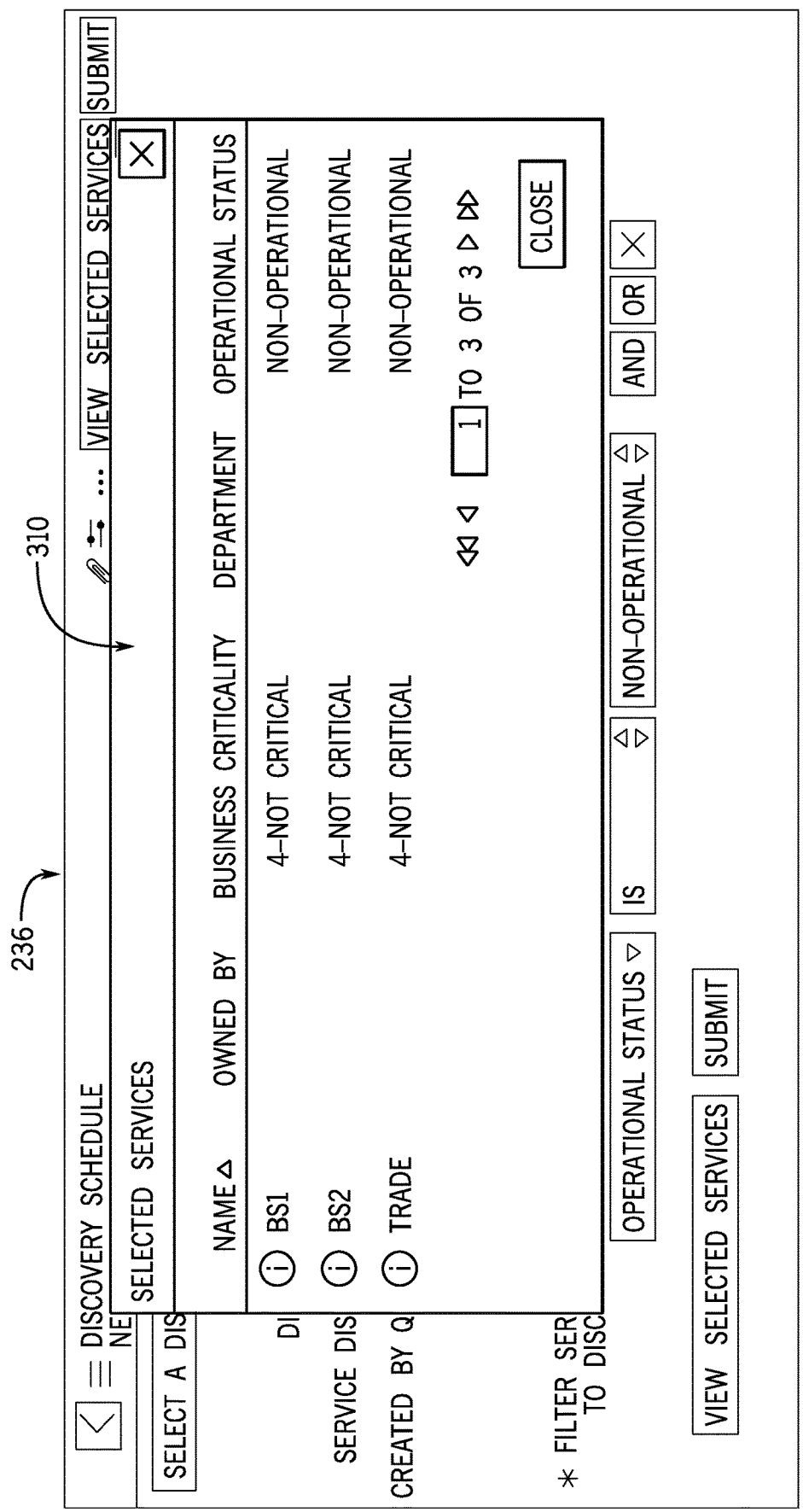
Figure 8:
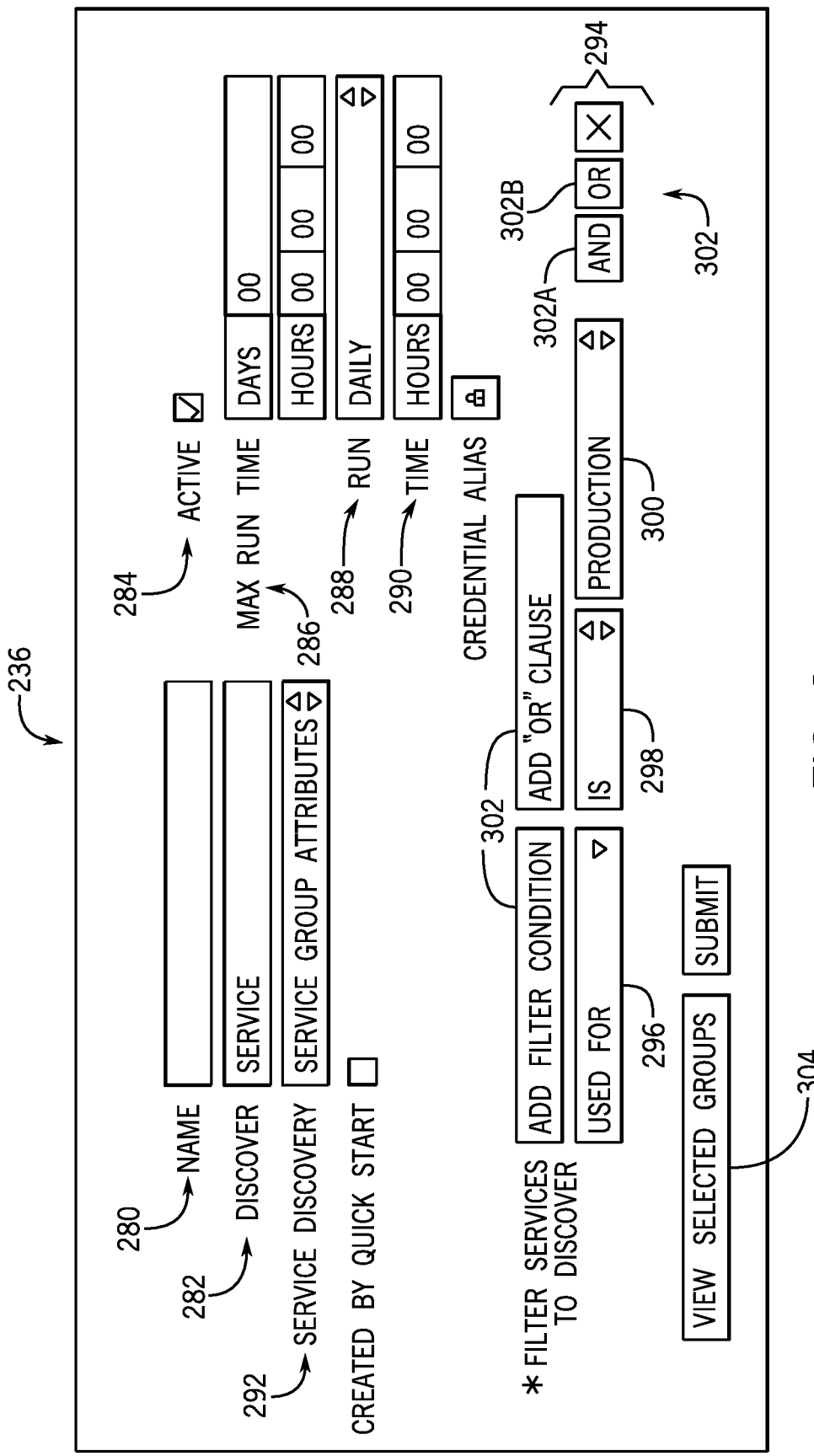
Figure 9:
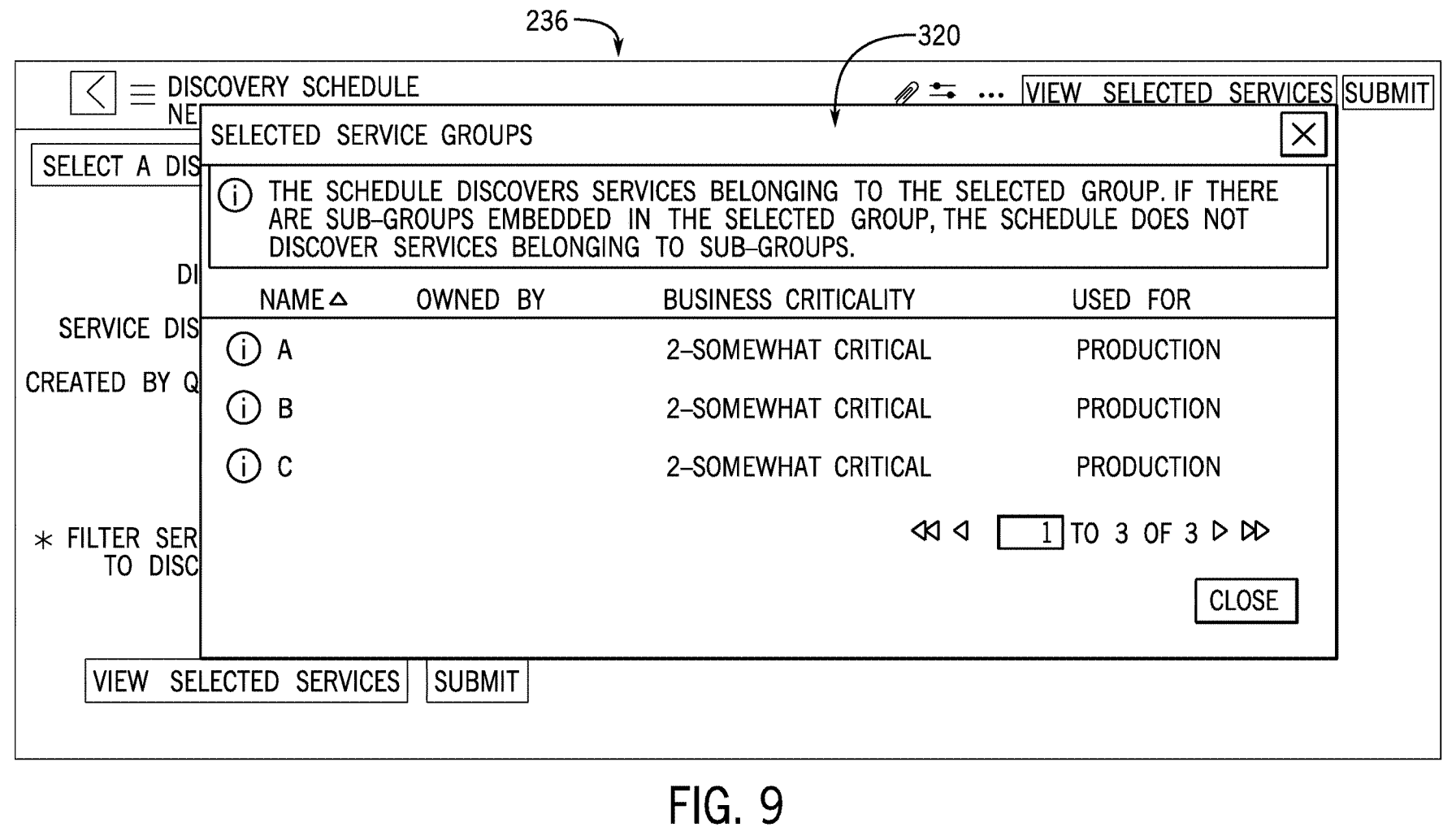

FIGS. 6-9 are simulated screenshots of portions of an embodiment of the GUI 236 of the discovery scheduler 232 discussed above. It may be appreciated that the illustrated portions of the GUI 236 are intended to be illustrative, and other embodiments may include other features (e.g., text boxes, drop down lists, buttons, etc.), in accordance with the present disclosure. As mentioned, the GUI 236 may be executed within a web browser of the client device 20 to enable the designer to define discovery schedules and discover schedule filters. More specifically, FIGS. 6 and 7 illustrate the GUI 236 being used to define a discovery schedule for services, while FIGS. 8 and 9 illustrate the GUI 236 being used to define a discovery schedule for services by service groups. It may be appreciated that the discovery schedule information presented by the GUI 236 corresponds to information retrieved from and stored in the Discovery Schedule table 228, Service table 222, and/or the Service Group table 224.

With the foregoing in mind, the portion of the GUI 236 illustrated in FIG. 6 includes a number of input mechanisms (e.g., text boxes, drop down lists, buttons, etc.) that are designed to receive inputs to define values for the properties of a discovery schedule. For example, the portion of the GUI 236 illustrated in FIG. 6 includes a Name field 280 designed to receive and present a string that represents a name of the discovery schedule. The GUI 236 includes a Discover field 282 (also referred to herein as the discovery type field) designed to receive and present a string value indicating the discovery type of the discovery schedule. The GUI 236 includes an Active checkbox 284 designed to receive and present a flag or Boolean value (e.g., selected or unselected) indicating whether the discovery schedule is active to be executed. The GUI 236 includes Max run time fields 286 designed to receive and present integer values indicating how long the corresponding discovery job will be allowed to execute by the discovery server 234 before it is terminated. The GUI 236 includes a Run drop down list 288 that is designed to receive and present a selection of when and how frequently the discovery schedule should be executed. When a "Particular Time" option is selected by the Run drop down list 288, then the Time fields 290 may receive and present integer values indicating a particular time at which the discovery schedule will be executed. In certain embodiments, each of the aforementioned input mechanisms is associated with a respective property represented by a respective field of the Discovery Schedule table 228.

Additionally, for the embodiment illustrated in FIG. 6, the GUI 236 includes a Service Discovery drop down list 292 having the "Service Attributes" value selected. This enables the designer to define one or more filters of the discovery schedule using the filter portion 294 of the GUI 236. The filter portion 294 of the GUI 236 includes an Attribute drop down list 296 that is designed to receive and present a selection of a service attribute (e.g., a column of the Service table 222). A non-limiting list of example attributes includes a name, an operational status, an "assigned to" indication, a maintenance schedule, a "managed by" indication", a "used for" indication, a domain name, or another suitable piece of information stored in the database 104 regarding services or service groups. The filter portion 294 includes a Comparison Operator field 298 that is designed to receive and present a selection of a comparison operator (e.g., "is", "is not", "is greater than", "is less than", "starts with", "includes", "does not include", and so forth). The filter portion 294 also includes a Value field 300 that is designed to receive and present a suitable value (e.g., a string, an integer, a real number) for the selected attribute of the filter. As such, it may be appreciated that certain comparison operators (e.g., "starts with", "includes") enable partial and wildcard matching for fields storing string values (e.g., a name field). Accordingly, it may be appreciated that the disclosed filter design and implementation process enables the construction of complex queries to identify qualifying services or service groups for discovery.

For the embodiment illustrated in FIG. 6, the filter portion 294 further includes additional filter buttons 302, including an AND button 302A and an OR button 302B, which enable an additional filter to be added to the discovery schedule with an appropriate AND or OR Boolean operator being used to combine the first and second filters. In certain embodiments, input received from these buttons may be stored in a corresponding Filter Combination field if the Discovery Schedule table 228, wherein the stored value indicates how each of the individual filters of the discovery schedule is logically combined when querying the Service table 222 or the Service Group table 224. When selected, the additional filter buttons 302 adds an additional row of fields to the filter portion, including another Attribute drop down list 296, Comparison Operator field 298, and Value field 300, to enable the designer to provide these values. In certain embodiments, each of the aforementioned input mechanisms of the filter portion 294 is associated with a corresponding field of the Discovery Schedule table 228. The aforementioned Filter Combination value, which is based on the user selection of the AND button 302A or the OR button 302B, is also stored in the record associated with the discovery schedule in the Discovery Schedule table 228.

For the embodiment illustrated in FIG. 6, the GUI 236 includes a View Selected Services button 304 that, when selected, presents a list of all currently defined services or service groups that satisfy the conditions of the one or more filters defined in the filter portion 294 of the GUI 236. For the illustrated example, the filter includes a condition to discover only services having a non-operational status. As such, for the illustrated example, when the View Selected Services button 304 is selected, then the discovery scheduler 232 responds by querying the Service table 222 to determine a list of all qualifying services, and then presenting this list in the portion of the GUI 236 illustrated in FIG. 7. More specifically, for this example, the portion of the GUI 236 illustrated in FIG. 7 includes a pop-up window 310 illustrating the list of services defined within the Service table 222 having a non-operational status. As such, the pop-up window 310 of the GUI 236 enables the designer to review the list of currently defined services that are returned by the filter to ensure that the filter is properly constructed before it is submitted.

For the embodiment illustrated in FIG. 8, the GUI 236 includes the Service Discovery drop down list 292 having the "Service Group Attributes" value selected. As such, the filter portion 294 of the GUI 236 includes an Attribute drop down list 296 that is designed to receive and present a selection of a service group attribute (e.g., a column of the Service Group table 224). For the illustrated example, the filter includes a condition to discover only services belonging to service groups that are designated as being in production use. As such, when the View Selected Services button 304 is selected, then the discovery scheduler 232 responds by querying the Service Group table 224 to determine a list of all qualifying service groups and presenting this list in the portion of the GUI 236 illustrated in FIG. 9. More specifically, for this example, the portion of the GUI 236 illustrated in FIG. 9 includes a pop-up window 320 illustrating the list of service groups defined within the Service Group table 224 having a "used for" attribute value of "Production." As such, the pop-up window 320 enables the designer to review the list of currently defined service groups that are returned by the filter to ensure that the filter is properly constructed before it is submitted. It should be noted that, as discussed with respect to FIG. 5, while the example filter is constructed to identify particular service groups, the discovery scheduler 232 will discover the services that are part of these service groups, rather than the service groups themselves, during the corresponding discovery job.

Figure 10:
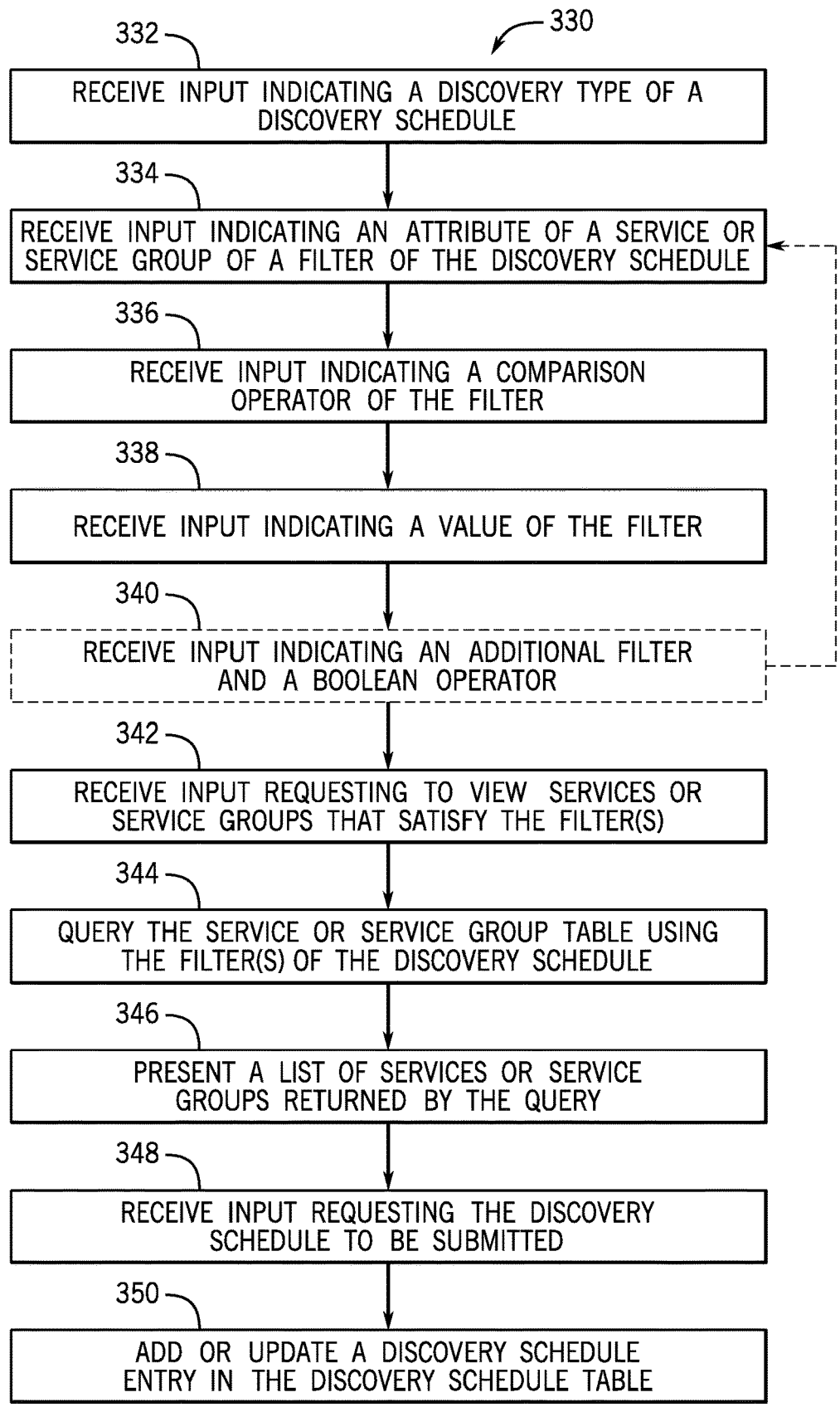
FIG. 10 is a flow diagram illustrating an example embodiment of a process by which the discovery scheduler defines a discovery schedule based on designer input received from the GUI, in accordance with aspects of the present technique.

FIG. 10 is a flow diagram illustrating an example embodiment of a process 330 by which the discovery scheduler 232 defines a discovery schedule based on designer input received from the GUI 236. It may be appreciated that the process 330 is merely an example, and in other embodiments, the process 330 may include additional steps, repeated steps, omitted steps, and so forth, in accordance with the present disclosure. The process 330 may be stored in a suitable memory (e.g., memory 206) and executed by a suitable processor (e.g., processor 202) associated with the client instance 102.

For the illustrated embodiment, the process 330 begins with the discovery scheduler 232 receiving (block 332) input indicating a discovery type of the discovery schedule. For example, the discovery type may be service or service group. In certain embodiments, the discovery scheduler 232 may also receive other property values (e.g., discovery schedule name, max run time, etc.) from the GUI 236, as discussed above. The discovery scheduler 232 also receives input (block 334) indicating an attribute of a service or service group, input indicating a comparison operator for the filter (block 336), and input indicating an attribute value for the filter (block 338). In certain embodiments, the process 330 may include receiving (block 340) input indicating that the discovery schedule includes an additional filter and a corresponding Boolean operator as the aforementioned Filter Combination value. For such cases, the process 330 may repeat the actions of blocks 334, 336, and 338 until all filters of the discovery schedule have been defined. In certain embodiments, the received inputs are used to generate suitable records and entries in the Discovery Schedule table 228.

Once all of the filters have been defined, the illustrated process 330 continues with the discovery scheduler 232 receiving (block 342) input requesting to view the currently defined services or service groups that satisfy the one or more filters. In response, the discovery scheduler 232 queries (block 344) the Service table 222 or the Service Group table 224 using the one or more filters of the discovery schedule, and presents (block 346) a list of services or service groups returned by the query, as discussed above. In certain embodiments, steps of block 342 and 344 may be omitted. Additionally, the discovery scheduler 232 may receive (block 348) input requesting the submission of the discovery schedule. In response, the discovery scheduler 232 may add or update (e.g., activate) (block 350) a discovery schedule entry within the Discovery Schedule table 228.

The technical effects of the present disclosure include enabling a selective discovery process for services and service groups for use in a CMDB. Present embodiments include a graphical user interface (GUI) that enables a designer to create and configure a discovery schedule that includes one or more filters. These filters enable the designer to define particular attributes and attribute values of services or service groups, including partial and wildcard attribute values. Each time the discovery schedule is executed, the discovery scheduler again determines which currently defined services or service groups satisfy the conditions of the filters, and then instructs a discovery server to discover CI data for only the qualifying services. This ensures that any new services that have been added to the CMDB and that meet the limitations of the filters will be discovered in subsequent discovery jobs.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
a database server storing a discovery schedule table;
a discovery scheduler associated with a client instance, wherein a processor of the system is configured to execute instructions stored in a memory of the system causing the discovery scheduler to perform actions comprising:
receiving a discovery type of a discovery schedule, wherein the discovery type comprises services or service groups;
receiving an attribute of a service or service group, a comparison operator, and an attribute value for a filter of the discovery schedule;
storing the discovery schedule in a discovery schedule record of the discovery schedule table, wherein the discovery schedule record includes the discovery type of the discovery schedule, as well as the attribute, comparison operator, and attribute value of the filter of the discovery schedule.

2. The system of claim 1, wherein the discovery scheduler comprises a graphical user interface (GUI) having respective input features configured to receive input from a user indicating the discovery type, the attribute, the comparison operator, and the attribute value.

3. The system of claim 1, wherein the database server stores a service table or a service group table, and wherein the processor is configured to execute the instructions to perform actions comprising:
receiving a request to view services or service groups that satisfy the filter; and
in response to the receiving the request, retrieving a set of services from a service table or service groups from a service groups table that satisfy the filter and presenting a list of the services or the service groups that satisfy the filter in response to the request.

4. The system of claim 1, wherein the processor is configured to execute the instructions to perform actions comprising:
receiving an input requesting addition of a second filter of the discovery schedule, wherein the input indicates either an AND or OR filter combination value;
receiving a second attribute, a second comparison operator, and a second attribute value of the second filter; and
storing the second filter in the discovery schedule record of the discovery schedule table, wherein the discovery schedule record includes the second attribute, the second comparison operator, the second attribute value, and the filter combination value.

5. The system of claim 1, wherein the database server stores a service table and a service group table, and wherein the processor is configured to execute the instructions to perform actions comprising running the discovery schedule by:
retrieving the discovery schedule and the filter from the discovery schedule table;
applying the filter of the discovery schedule to the service table, the service group table, or a combination thereof, to identify a set of services that satisfy the filter;
instructing a remote discovery server disposed on a client network to execute a discovery job to discover the set of services or service groups on the client network, and, in response, receiving CI data related to the set of services or service groups from the discovery server; and
updating the service table or the service group table using the CI data.

6. The system of claim 5, wherein, to apply the filter of the discovery schedule to identify the set of services, the processor is configured to execute the instructions to perform actions comprising:
applying the filter of the discovery schedule to the service group table to identify a set of service groups that satisfy the filter; and
identifying the set of services from the service table, wherein each service of the set of services is associated with a service group of the identified set of service groups.

7. A method of operating a discovery scheduler, comprising:
retrieving a discovery schedule for a set of services or service groups associated with a client network;
retrieving a filter of the discovery schedule;
applying the filter of the discovery schedule to a service table, a service group table, or a combination thereof, identify a set of services that satisfy the filter;
defining a discovery job based on the set of services; and
instructing a discovery server associated with the client network to execute the discovery job to discover the set of services associated with the client network.

8. The method of claim 7, comprising:
in response to instructing the discovery server to execute the discovery job, receiving configuration item (CI) data related to the set of services from the discovery server.

9. The method of claim 8, comprising:
in response to receiving the CI data from the discovery server, updating a service table or a service group table of a configuration management database (CMDB) using the CI data.

10. The method of claim 7, wherein applying the filter of the discovery schedule to identify the set of services comprises:
applying the filter of the discovery schedule to the service group table to identify a set of service groups that satisfy the filter; and
identifying the set of services from the service table, wherein each service of the set of services is associated with a service group of the identified set of service groups.

11. The method of claim 7, wherein the set of services or service groups includes only a single service or service group.

12. The method of claim 7, comprising, before retrieving the discovery schedule, creating the discovery schedule by:
receiving at least one property value for at least one property of the discovery schedule; and
storing the discovery schedule in a discovery schedule record of a discovery schedule table, wherein the discovery schedule record includes the at least one property value.

13. The method of claim 12, wherein the at least one property comprises a discovery schedule name, a discovery schedule type, and an active status.

14. The method of claim 12, wherein creating the discovery schedule comprises creating the filter of the discovery schedule by:
receiving an attribute of a service or service group, a comparison operator, and an attribute value of the filter; and
storing the filter in the discovery schedule record, wherein the discovery schedule record stores the attribute, the comparison operator, and the attribute value of the filter of the discovery schedule.

15. The method of claim 14, wherein creating the filter of the discovery schedule comprises:
receiving an input requesting addition of a second filter of the discovery schedule, wherein the input indicates either an AND or OR filter combination value;
receiving a second attribute, a second comparison operator, and a second attribute value of the second filter; and
storing the second filter in the discovery schedule record, wherein the second discovery schedule record includes the second attribute, the second comparison operator, the second attribute value, and the filter combination value.

16. One or more non-transitory, computer-readable media at least collectively storing instructions executable by a processor configured to implement a discovery scheduler, the instructions comprising instructions to:
receive a name, a discovery type, and an active status for a discovery schedule, wherein the discovery type comprises services or service groups;
receive an attribute of a service or service group, a comparison operator, and an attribute value for a filter of the discovery schedule;
using the filter of the discovery schedule to query a services table, a service groups table, or a combination thereof, to retrieve a set of services that satisfy the filter;
define a discovery job based on the set of services;
instruct a remote discovery server to execute the discovery job to discover the set of services on a client network, and, in response, receive configuration item (CI) data related to the services from the discovery server; and
update the services table using the CI data.

17. The media of claim 16, wherein the instructions comprise instructions to:
present a graphical user interface (GUI) having respective input features configured to receive a input from a user indicating the name, the discovery type, the attribute, the comparison operator, and the attribute value.

18. The media of claim 16, wherein the instructions comprise instructions to:
in response to receiving the name, the discovery type, and the active status, store the discovery schedule in a discovery schedule record of a discovery schedule table, wherein the discovery schedule record includes the name, the discovery type, and the active status; and
in response to receiving the attribute, the comparison operator, and the attribute value of the filter, store the filter in the discovery schedule record, wherein the discovery schedule record includes the attribute, the comparison operator, and the attribute value.

19. The media of claim 16, wherein the instructions comprise instructions to:
receive an input requesting addition of a second filter of the discovery schedule, wherein the input indicates either an AND or OR filter combination value;
receive a second attribute, a second comparison operator, and a second attribute value of the second filter; and
use the filter, the second filter, and the filter combination value to query the services table, the service groups table, or the combination thereof, to retrieve the set of services that satisfy the filter and the second filter of the discovery schedule.

20. The media of claim 16, wherein the service table and the service group table are part of a configuration management database (CMDB) that is configured to store the CI data for CIs of the client network.

* * * * *